United States Patent
Armentrout et al.

(10) Patent No.: US 8,483,567 B2
(45) Date of Patent: Jul. 9, 2013

(54) INFRARED COMMUNICATION SYSTEM AND METHOD

(75) Inventors: Douglas B. Armentrout, Purcellville, VA (US); Thomas R. Boyer, Gambrills, MD (US)

(73) Assignee: Immediate Response Technologies, Inc, Glenn Dale, MD (US)

( * ) Notice: Subject to any disclaimer, the term of this patent is extended or adjusted under 35 U.S.C. 154(b) by 428 days.

(21) Appl. No.: 11/103,170

(22) Filed: Apr. 11, 2005

(65) Prior Publication Data

US 2005/0224716 A1    Oct. 13, 2005

Related U.S. Application Data

(60) Provisional application No. 60/561,161, filed on Apr. 9, 2004.

(51) Int. Cl.
*H04B 10/00* (2006.01)

(52) U.S. Cl.
USPC .......................................... 398/118; 398/140

(58) Field of Classification Search
USPC ................. 398/118–141, 151, 153, 156, 158, 398/159, 182, 192, 197, 202, 208, 38, 33
See application file for complete search history.

(56) References Cited

U.S. PATENT DOCUMENTS

| | | | |
|---|---|---|---|
| 4,964,727 A * | 10/1990 | Huggins | 356/617 |
| 5,661,257 A | 8/1997 | Nielson et al. | 102/334 |
| 5,670,942 A | 9/1997 | Lewis | 340/555 |
| 5,686,889 A | 11/1997 | Hillis | 340/540 |
| 5,763,882 A | 6/1998 | Klapper et al. | 250/332 |
| 5,804,829 A | 9/1998 | Palmer | 250/504 H |
| 5,822,099 A | 10/1998 | Takamatsu | 359/153 |
| 5,986,581 A | 11/1999 | Magdaleno, II et al. | 340/953 |
| 6,031,470 A * | 2/2000 | Asari et al. | 341/22 |
| 6,069,557 A | 5/2000 | Anglin, Jr. et al. | 340/321 |
| 6,133,569 A | 10/2000 | Shoda et al. | 250/332 |
| 6,175,308 B1 * | 1/2001 | Tallman et al. | 340/539.11 |
| 6,198,501 B1 | 3/2001 | Nemiroff et al. | 348/135 |
| 6,211,951 B1 | 4/2001 | Guch, Jr. | 356/152.1 |
| 6,233,079 B1 | 5/2001 | Miyamori | 359/180 |
| 6,292,212 B1 | 9/2001 | Zigadlo et al. | 348/33 |
| 6,343,158 B1 | 1/2002 | Shiohara | 382/261 |
| 6,504,155 B1 | 1/2003 | Ookawa | 250/352 |
| 6,507,425 B1 | 1/2003 | Dewberry et al. | 359/163 |
| 6,538,820 B2 | 3/2003 | Fohl et al. | 359/625 |
| 6,606,115 B1 * | 8/2003 | Alicandro et al. | 348/164 |
| 6,608,688 B1 | 8/2003 | Faul et al. | 356/614 |
| 6,611,207 B1 | 8/2003 | Yuan et al. | 340/630 |
| 6,625,399 B1 | 9/2003 | Davis | 396/263 |
| 6,633,684 B1 | 10/2003 | James | 382/274 |
| 6,635,892 B2 | 10/2003 | Kelly, Jr. et al. | 250/493.1 |
| 6,707,044 B2 | 3/2004 | Lannestedt et al. | 250/351 |

(Continued)

FOREIGN PATENT DOCUMENTS

JP          10-221162      *  8/1998
WO     WO 03/036829 A1 *  1/2003

*Primary Examiner* — M. R. Sedighian
(74) *Attorney, Agent, or Firm* — Duane Morris LLP

(57) ABSTRACT

A communication system and method utilizing an infrared signal emitter communicating a predefined signal, and an infrared signal receiver capable of receiving such predefined signal, distinguishing such predefined signal within a field of view of the infrared signal receiver, and providing output indicating the location of the infrared signal emitter within the field of view of the infrared signal receiver.

8 Claims, 3 Drawing Sheets

U.S. PATENT DOCUMENTS

| | | | |
|---|---|---|---|
| 6,768,126 B2 | 7/2004 | Novak et al. | 250/504 R |
| 7,639,950 B1 * | 12/2009 | Ashley et al. | 398/119 |
| 2002/0171754 A1 | 11/2002 | Lai et al. | 348/371 |
| 2002/0172410 A1 | 11/2002 | Shepard | 382/141 |
| 2003/0137593 A1 | 7/2003 | Watanabe et al. | 348/274 |
| 2004/0161246 A1 * | 8/2004 | Matsushita et al. | 398/187 |
| 2005/0147299 A1 * | 7/2005 | Wang et al. | 382/181 |

* cited by examiner

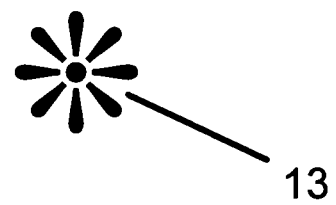
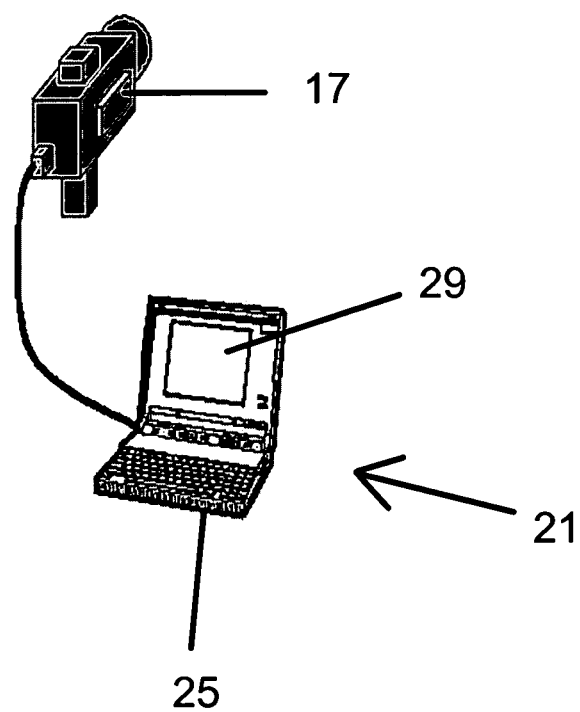
Figure 1

INFRARED COMMUNICATION SYSTEM AND METHOD

CROSS REFERENCE TO RELATED APPLICATION

This application is based upon and claims benefit of copending and co-owned U.S. Provisional Patent Application Ser. No. 60/561,161 entitled "Infrared Communication System and Method," filed with the U.S. Patent and Trademark Office on Apr. 9, 2004 by the inventors herein, the specification of which is incorporated herein by reference.

BACKGROUND OF THE INVENTION

1. Field of the Invention

This invention relates generally to systems and methods for communicating via an infrared signal, and more particularly to a communication system and method utilizing an infrared signal emitter communicating a predefined signal, and an infrared signal receiver capable of receiving such predefined signal, distinguishing such predefined signal within a field of view of the infrared signal receiver, and providing output indicating the location of the infrared signal emitter within the field of view of the infrared signal receiver.

2. Background of the Prior Art

Night vision devices exist that aid a user in viewing scenery and objects that they would otherwise have difficulty viewing in darkness. Such devices function by intensifying available light. Even a small LED appears as a large, bright headlight when viewed through night vision devices, even from great distances. This effect is referred to as blooming and allows very small near infrared signaling devices, such as a Budd Light, Phoenix Light, or VIP Light, to be used as a marker or beacon for a person or object carrying such device, which marker or beacon may be readily viewed through night vision devices even from great distances. Unfortunately, however, such near infrared signaling device becomes simultaneously visible to anyone else equipped with night vision devices. If the purpose is identification of friendly forces in a combat environment, for example, it will serve little usefulness if the enemy is likewise equipped with night vision devices.

Infrared cameras, on the other hand, function by detecting differences in the amount of electromagnetic energy emitted by different objects in the field of view of the camera, in either the mid infrared or far infrared wavelengths (collectively thermal infrared), and presenting a representation of the field of view of the infrared camera on a display. There is no blooming effect with infrared cameras. Rather, the relative size of an object displayed is accurate and does not increase based on the amount of electromagnetic energy the object is emitting. This characteristic of infrared cameras has necessitated that thermal infrared marking or signaling devices be of sufficient size that they can be distinguished from all other thermal infrared sources in the field of view of the infrared camera by a person looking at the display. Particular environmental conditions and the magnification and optical quality of the infrared camera being used typically dictate the distance from which a marker or signaling device of a given size can be adequately detected by a person viewing the display. By way of example, in order to readily view a thermal infrared marking device at a distance of 4 to 5 kilometers by a currently available military infrared camera with 10-power magnification, the marking device would typically need to be in excess of 200 square inches in size. Such size requirements for distant surveillance limit the usefulness of static infrared markers.

Compounding this problem is the number of objects in the field of view of the infrared camera emitting infrared energy, including buildings, vehicles, concrete or other pavement, electrical devices, power lines, vegetation, and a long list of other items that can create hot spots in the camera's field of view. Distinguishing a thermal infrared marking or signaling device from all of the infrared sources in the filed of view can be a significant challenge. Solutions include making the thermal infrared marking device significantly large and/or arranging a number of devices in an unnatural pattern, such as the "Inverted Y" pattern used by the military for marking helicopter landing zones.

Flashing infrared emitters have also been provided for use as marking and signaling devices to allow such marking and signaling devices to be more easily distinguished from other objects in the field of view, as the flashing signal draws the attention of the person viewing the display. However, there are high costs associated with the manufacture of flashing thermal infrared emitters of sufficient size so as to enable them to be viewed from distances that would render them useful as markers and signaling devices. Moreover, even if cost were not an issue, such flashing emitters would have to be provided in such size that would render them unsuitable for use where compact size and portability are required features, such as where the device is intended for use as a portable marker or signaling device for military or law enforcement personnel.

Given these difficulties, there remains a need for a system and method enabling the observation and detection of an infrared marker and/or signaling device from a distance that maintains the usefulness of such device for its intended function, while keeping the device small enough to be portable, such as when used as a personnel marker or signaling device.

SUMMARY OF THE INVENTION

The present invention provides a system and method for the remote detection and observation of a compact infrared communication device. In a first embodiment of a system incorporating the invention, a compact, programmable infrared signal emitter is provided that is programmed to emit a flashing signal in the mid infrared or far infrared energy spectrum, along with an infrared signal receiver, preferably an infrared camera, capable of measuring and outputting to a display the infrared energy emitted from objects in the camera's field of view, and an analysis module capable of analyzing the output from the infrared camera, automatically detecting a location of the flashing emitter in the camera's field of view, and optionally displaying an indicia (in the form of a cross-hair, cursor, circle, or other mark or textual message) on a display to indicate the location of such emitter in the camera's field of view, and to display a message corresponding to the infrared signal that was detected.

In a first embodiment of a method incorporating the invention, a compact, programmable infrared signal emitter that emits a predetermined flashing infrared signal is provided. An infrared signal receiver, such as an infrared camera, collects information descriptive of the infrared energy of objects within the camera's field of view (including the varying infrared energy of the flashing emitter), and forwards such information to an analysis module that determines the location within the camera's field of view of the infrared emitter, based upon the detection of the predetermined flashing infrared signal, and optionally creates an indicia (in the form of a cross-hair, cursor, circle, or other mark or textual message) on a display to indicate the location of such emitter in the camera's field of view, and optionally displays a message corresponding to the infrared signal that was detected.

BRIEF DESCRIPTION OF THE DRAWINGS

The above and other features, aspects, and advantages of the present invention are considered in more detail, in relation to the following description of embodiments thereof shown in the accompanying drawings, in which:

FIG. 1 is a schematic depicting an exemplary system according to a first embodiment of the invention.

DETAILED DESCRIPTION OF THE INVENTION

Figure 2:
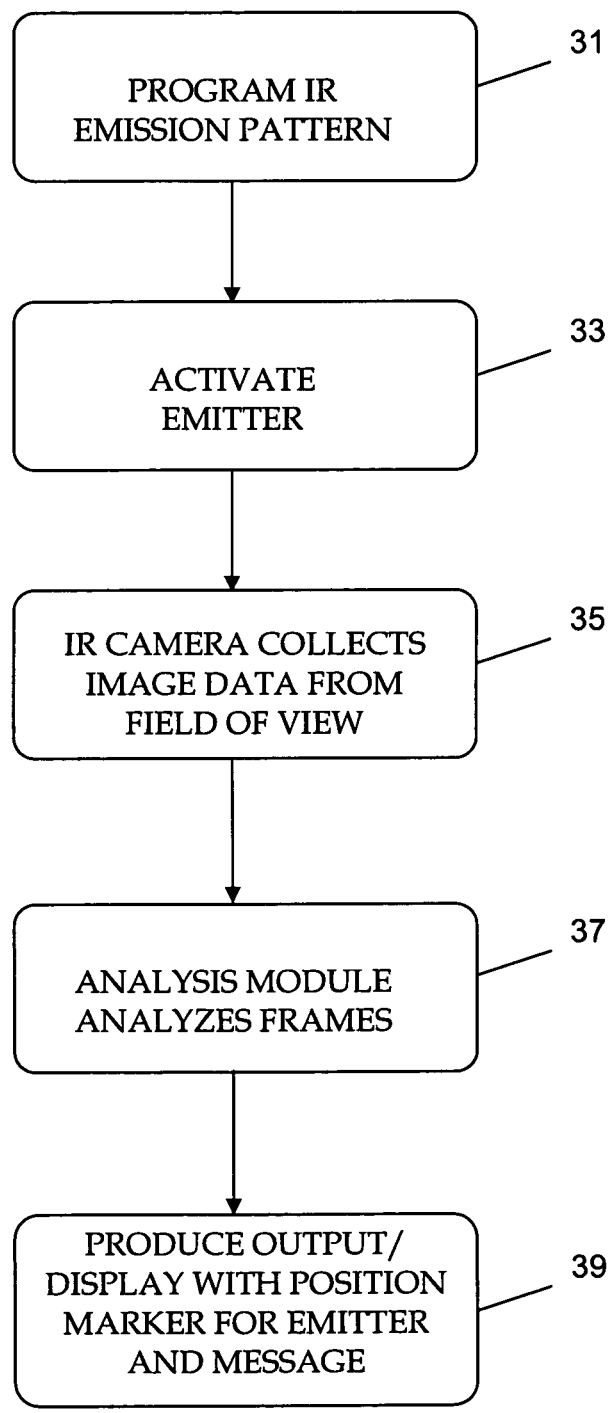
FIG. 2 is a flow chart depicting an exemplary method according to a first embodiment of the invention.

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Infrared cameras detect differences in mid infrared or far infrared energy emitted by objects in the field of view and present that information in a display. Infrared cameras have the ability to adjust the gain and other features of the displayed picture depending on what is being detected in the field of view. Current infrared cameras are capable of localized image modification instead of adjusting the entire display based solely on the hottest object in the field of view, or the coldest, or some single average of all items. Rather, current infrared cameras are able to adjust the gain locally, thus presenting different portions of the display differently depending on what the infrared camera is detecting in each such portion of the field of view. Even where that portion is so small that it only represents a small number of pixels in the display, current infrared cameras are, nonetheless, able to adjust the gain for such limited number of pixels automatically, thus enabling the display of a field of view that has highly varied sources of infrared energy. It has been found that such current capability of existing infrared cameras can be adapted to resolve difficulties associated with the required size of thermal infrared marking and signaling devices, as well as difficulties associated with distinguishing marking and signaling devices from other mid infrared and far infrared sources in the camera's field of view. It has also been found that such current capability of existing infrared cameras can be adapted to provide improved security features and provide more enhanced signaling capabilities.

More particularly, it is understood that the infrared image data provided to the infrared camera is currently used to adjust the display gain automatically in a localized portion of the field of view by scanning each frame that is captured by the camera, and particularly by scanning all pixels of each such frame, and modifying the gain of the specific pixels or groups of pixels in each such frame as necessary to clearly display those localized regions having disproportionately high or low levels of infrared energy. In similar fashion, in an exemplary method according to a first embodiment of the present invention, each frame of image data from the infrared camera is processed by scanning each pixel of the frame and comparing the infrared energy detected at each pixel to the same relative pixel or group of surrounding pixels in multiple frames. (It is recognized that the camera and target may not be stationary. Accordingly, when referring to the 'same' pixel, is should be understood that this refers to the same relative physical location of the object being viewed.) By making such comparison, a cycle modulating between distinct levels of infrared energy may be detected and measured in individual pixels or pixel groupings. When such a cycle modulating between distinct levels of infrared energy matches a stored modulating cycle (representing a predetermined flashing pattern), an analysis module may cause the camera display or other output to display or otherwise include a graphic, marker, or other indicia indicative of the location of the infrared emitter in the field of view of the camera. Notably, such indicia may be generated on the display or otherwise output in any form so that it may be viewed or otherwise used by a person or equipment receiving the output from the camera. Thus, even where a person viewing a display of the output of the camera is not able to discern the specific pixels that are registering the flashing emitter (because the emitter is too small in the field of view of the infrared camera), the automated method nonetheless informs such user of the precise location of such flashing emitter within the field of view of the camera. Such ability to detect flashing patterns in the infrared camera image data at the level of individual pixels or small groupings of pixels thus enables a person viewing the camera output to view the location of the infrared emitter in the field of view of the camera, even though they might not have been able to discern such infrared emitter if they were looking at the displayed output without such analysis.

With reference to FIG. 1, in accordance with such first exemplary method according to a first embodiment of the invention, a portable infrared emitter 13 is provided, such portable infrared emitter being programmed to modulate its infrared emissions in some predetermined pattern. The infrared energy emitted from the emitter may vary between no energy and whatever infrared energy is emitted for each flash, or between two distinct levels of infrared energy, e.g., a high level and a low level, or even two distinct levels very near to one another. The emitter 13 is preferably programmable such that the parameters of the flash pattern may be modified. More preferably, the emitter 13 is preferably programmable such that the parameters of the flash pattern may be modified to cause the emitter 13 to flash in a pattern that matches one or more predetermined patterns that correspond to a particular message or condition. By way of example only, if the emitter is intended to be worn by a soldier, the emitter may be programmed to emit a flash pattern that equates to a message such as "friendly," "pickup," "resupply," "SOS," and so on. In a preferred embodiment, emitter 13 operates in the mid infrared or far infrared energy spectrum.

An infrared camera 17 is directed toward the portable flashing emitter, and a processing device 21, such as a portable computer or on-board microprocessor comprising an analysis module 25 and a memory or data storage section, receives the image output of the infrared camera 17 for processing as described above to detect whether the image data received by the infrared camera 17 includes a flashing infrared pattern that matches a pattern stored in memory. Preferably, the patterns stored in such memory correspond to the same set of messages or conditions as the patterns capable of being emitted by the emitter 13. When the analysis module 25 detects the presence of a predetermined flashing thermal infrared pattern in the image data, the processor 21 may alter what is presented in the visual screen 29 or other data output as described above. More particularly, when the analysis module 25 determines that a predetermined flashing pattern is present in a series of images received from the infrared camera 17, the processor 21 alters the output from the camera 17 to, for example, display, on the visual screen 29, a clearly visible dot, circle, crosshair, or similar indicia around the location of the flashing pattern, even if such flashing pattern is small relative to the entire display, and even if the pattern exists in a region that is so small that it would not likely be detected by a person observing the camera output without such processing. The processor 21 could also, optionally, display a specific message to which the flashing pattern relates. For example, if the emitter 13 is flashing a pattern indicative of a "RESUPPLY" message, once the processor 21 determines that such pattern is present in the output from the camera 17, it would, optionally, display, on the visual screen 29, a dot, circle, crosshair, etc. around the location of the flashing pattern and simultaneously display a text message, such as "RESUPPLY," to indicate both the location and specific meaning of the detected flashing pattern. Because the emitter 13 may be programmed with different flash patterns and because the processor 21 may access a library of such patterns stored in memory, the above-described ability to change patterns with the infrared camera 17 and thermal infrared signaling devices allows for sophisticated signaling, the ability to change codes, and various encryption and decryption methods.

In order to implement such method, an exemplary system according to a first embodiment of the invention includes a flashing thermal infrared signaling device 13 capable of emitting coded signals, and a thermal imager 17, the output of which is directed to a processing system 21 to look for specific flashing infrared signals in the field of view of the thermal imager 17.

Referring now to FIG. 2, the flashing infrared signaling device is capable of flashing a sequence based on user input. The flashing infrared signal should be in the mid infrared or far infrared energy spectrum. As shown at 31, a predetermined infrared emission pattern is programmed into the emitter. The sequence may be any desired sequence, limited only by the maximum flash rate of the thermal infrared signaling device and the maximum frame (sampling) rate of the infrared camera used to detect such sequence. The sequence can be programmed to any desired predetermined pattern, thus enabling use of the signaling device to, by way of example, present a "code of the day," present a standard code, present a specific communication, or serve to be recognized as simply a position marker by the infrared camera. Notably, the flashing infrared signaling device does not have to modulate between off and on to enable the infrared camera to recognize the infrared signaling device. Contrastingly, a human eye places this requirement on the eye because it cannot sense the differences between small changes in temperature the way that a digital thermal imager can. Because the emitter may be operated, and more specifically detected by an infrared camera and analysis system as described herein, even when modulating between slightly different levels of infrared emission, the signal emitted may be covert to anyone with a thermal camera unless they are equipped with the same analysis system, and particularly the predetermined flashing sequences. Therefore, any other person equipped with even the most current infrared camera technology (or with any night vision device) could look directly at the thermal infrared signal device and never recognize it. Moreover, because the emitter may modulate between slightly different levels of infrared emission, it may operate at a faster flash rate. For example, while current state of the art flash rates for infrared emitters are on the order of 1 Hz, it is anticipated that an infrared emitter as set forth herein could increase such flash rate by at least two orders of magnitude. The frame (sampling) rate of the infrared camera could also be increased to allow for faster data rates. Preferably, the infrared signal from the emitter is modulated as little as possible to achieve a clear, noise free communication. "Modulation" refers to the difference between the maximum and minimum infrared energy emitted. If the infrared signaling device were heated to be the same temperature as the hottest item in the image and then cooled to be the same temperature as the coolest item in the image, the thermal infrared signaling device would be modulating at 100%. Likewise, if the infrared signaling device were heated to be as hot as the hottest item in the image and then cooled to be the same temperature as the average item in the image, the thermal infrared signaling device would be modulating at 50%. Again, it would be preferable to reduce the modulation to the lowest level possible while ensuring detection by the infrared camera.

In use, a user in the field activates the emitter, as shown at 33. In a preferred embodiment, the emitter would be a small, lightweight, signaling device having low power requirements, such as a battery-operated device. Furthermore, in a preferred embodiment, the emitter would operate in the mid infrared or far infrared energy spectrum.

The exemplary system according to a first embodiment of the invention also includes an infrared camera capable of detecting the infrared energy emitted by objects in its field of view. The infrared camera collects image data from its entire field of view, as shown at 35. A processor is provided in communication with the infrared camera to receive image data therefrom. The processor may be, for example, a microprocessor built into a control unit for the infrared camera, or a separate computer in electrical communication with such infrared camera. The processor employs very fast digital analysis module with signal processing capability to analyze the frames of the camera display, as shown at 37. The processor produces an output that may include indicia of a position marker for the emitter, when detected, and, optionally, an appropriate message, as shown at 39.

Figure 3:
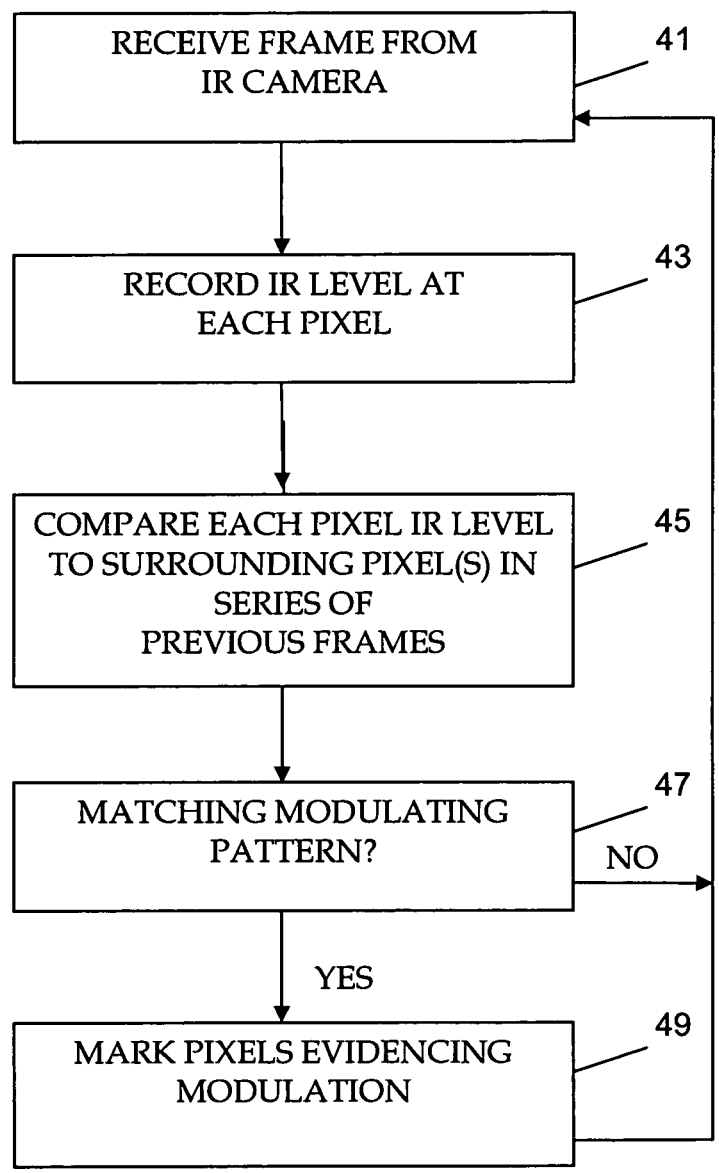
FIG. 3 is a flow chart depicting an exemplary analysis process performed by an analysis module according to a first embodiment of the invention.

FIG. 3 shows an exemplary analysis process. At 41, the analysis module receives a frame image from the infrared camera. The analysis module evaluates every pixel in the image as it looks for an encoded signal. At 43, the level of infrared energy or frequency is recorded for each pixel. At 45, the infrared level of each pixel is compared to surrounding pixels in the same frame and in a series of preceding frames. Since the receiver can be moving, the analysis for each pixel is performed based upon its relative location in the field of view of the receiver, so that the energy from the same physical location is analyzed. The analysis module keeps track of the energy level and relative physical location for each pixel. At 47, the analysis module determines if a modulating pattern exists and if it matches a predetermined pattern stored in memory. If not, the processing continues with the next frame. If, at 49, a modulating pattern is found, the relative physical location of the pixel is marked before processing continues with the next frame.

When an encoded signal is detected, the infrared camera and processor preferably track the infrared signaling device and display to the user an indicia noting the position of the infrared emitter in the field of view of the infrared camera and/or a textual message corresponding to the detected flash sequence.

The above-described system and method provide significant advantages over prior art infrared communication systems and methods. The infrared signaling device is of a compact, portable construction, but the analytical system described above enables its detection even from significant distances, thus rendering it useful as a remote marker, signaling device, or other communications device for military forces, law enforcement personnel, and search and rescue personnel. The small size of the infrared imaging device provides lighter weight than previously known emitters used for such purposes, lower power requirements, lower production costs, greater transportability, and greater concealability. The infrared imaging device preferably operates in the thermal infrared range. The system and method described herein enable detection of a thermal infrared signal that might not be readily apparent or distinguishable to a person looking at the displayed output from an infrared camera pointed at such signal. Moreover, the flashing pattern or modulation only needs to be detected by the system, and not by a person viewing the display, thus providing a more secure infrared signaling device than has previously been available. Programmability of the infrared emitter to emit various flashing sequences, and the ability of the processor to detect and identify such sequences, provides support for sophisticated signaling. For instance, the infrared camera may react to a specific flashing sequence by displaying a marker on the displayed output from the camera indicating the location of the emitter in the camera's field of view, a text message indicating the subject matter of the received message, or combinations of the two. Likewise, the processor may be programmed to identify specific flashing sequences from a library of predetermined sequences stored in memory, ignoring other flashing sequences detected in the camera's field of view. Thus, a first user having an infrared camera may receive only such messages that are indicated for that user, while a second user having a second infrared camera receives only those messages that are indicated for that second user, even though both users may be viewing precisely the same scene. By way of example, this may be advantageous where multiple helicopters, each equipped with an infrared camera, are attempting to land at adjacent, predesignated landing sites, and require a signal to indicate which site is their intended landing site.

The method and system described herein have wide reaching application, for example for the military, law enforcement, and search and rescue communities, including (but not limited to) for use as: (i) markers for landing zones, pickup zones, and drop zones; (ii) remote identification of friend or foe on a battlefield; (iii) line of sight signaling without the threat of radio detection; (iv) identification and location of police officers, police cars, and surveillance vehicles; and (v) identification and discrimination of friendly security personnel from intruders. Of course, such method and system are also widely applicable to any application in which it is desired to provide a remote, covert communication method.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A communication system, comprising:
   an emitter that emits an infrared signal having a selectable signal pattern comprising changing energy levels having at least a first energy level and a second energy level;
   a receiver that receives said infrared signal;
   a processor operationally attached to said receiver and that analyzes the received signal detect a pattern of changing energy levels;
   a display device that displays a visually discernable output indicating the presence of said signal if the pattern of said signal is recognized; and,
   said processor further comprising an analysis module that compares each pixel of output from said receiver to the same relative pixel from a previous frame and/or to surrounding pixels in order to determine a pattern of changing levels between distinct levels of infrared energy.

2. The communication system according to claim 1, wherein
   said analysis module compares the pattern of changing levels to one or more stored signal patters in order to determine if said pattern or changing levels matches at last one stored signal pattern; and
   displays an indicia on said display device corresponding to the infrared signal that was detected.

3. The communication system according to claim 2 wherein said analysis module determines the location within the field of view of said receive based upon the detection of said infrared signal.

4. The communication system according to claim 2, wherein said analysis module displays a textual message on said display device corresponding to the infrared signal that was detected.

5. A method of communication, comprising:
   providing an emitter that emits an infrared signal having a selectable signal pattern comprising changing energy levels;
   providing a receiver that receives said infrared signal and a processor operationally attached to said receiver;
   analyzing the received signal to detect a pattern of changing energy levels; and
   displaying an output indicating the presence of said signal if the pattern of said signal is recognized;
   receiving said signal;
   collecting image data from each frame on a pixel-by-pixel basis.
   comparing each pixel of output from said receiver to the same relative pixel from a previous frame and/or to surrounding pixels;
   determining a pattern of changing levels between distinct levels of infrared energy; and
   marking said pixel if a pattern is found.

6. The method according to claim 5 further comprising the steps of:
   comparing said pattern of changing levels to one or more stored signal patterns
   determining if said pattern of changing levels matches at least one stored signal pattern; and
   displaying an indicia corresponding the infrared signal that was detected.

7. The method according to claim 6, further comprising displaying a location of the signal in the field of view of said receiver.

8. The method according to claim 6, further comprising displaying a textual message corresponding to the signal that was detected.

* * * * *